United States Patent [19]

Yamaguchi et al.

[11] Patent Number: 4,858,518

[45] Date of Patent: Aug. 22, 1989

[54] CONTROL APPARATUS FOR AUTOMOBILE AIR CONDITIONING SYSTEMS

[75] Inventors: Hideo Yamaguchi, Higashihiroshima; Tsutomu Fujiki, Hiroshima, both of Japan

[73] Assignee: Mazda Motor Corporation, Hiroshima, Japan

[21] Appl. No.: 231,862

[22] Filed: Aug. 12, 1988

[30] Foreign Application Priority Data

Aug. 12, 1987 [JP] Japan ................. 62-202570

[51] Int. Cl.[4] .................. B60H 1/32
[52] U.S. Cl. ................. 98/2.08; 98/2.11; 237/12.3 A
[58] Field of Search ............. 62/244; 236/13; 98/2.11, 2.08; 165/42, 43, 25; 237/12.3 A, 12.3 B

[56] References Cited

U.S. PATENT DOCUMENTS

| 3,934,642 | 1/1976 | Coulson et al. | 165/42 X |
| 4,216,822 | 8/1980 | Izumi | 165/42 |
| 4,262,738 | 4/1981 | Kato et al. | 165/25 |
| 4,382,463 | 5/1983 | Ikibukuro | 165/43 X |
| 4,730,662 | 3/1988 | Kobayashi | 165/25 |

Primary Examiner—William E. Tapolcai
Attorney, Agent, or Firm—Fleit, Jacobson, Cohn, Price, Holman & Stern

[57] ABSTRACT

An automobile air conditioning system controlled to create various airflow modes including at least one dual airflow mode in which two airflow modes are made simultaneously effective. Operating airflow mode selecting switches are provided one individual to each airflow mode. A regulating switch, associated with the airflow selecting switch for the dual airflow mode, is provided to regulate a quantitative ratio of airflow in the dual airflow mode either stepwise or substantially linearly to thereby produce delicately controlled dual outlet airflow.

19 Claims, 3 Drawing Sheets

CONTROL APPARATUS FOR AUTOMOBILE AIR CONDITIONING SYSTEMS

BACKGROUND OF THE INVENTION

1. Field of the Invention

The present invention relates to an automobile air conditioning system which can be operative in various airflow modes, and more particulary to a control apparatus for an automobile air conditioning apparatus in which a quantitative ratio of outlet air blows off from two different air ducts in a dual airflow mode.

2. Description of the Prior Art

Generally, automobile air conditioning systems have an evaporator and a heater core disposed in a main air duct through which air, recirculated or outside, taken in the main air duct is cleaned, dehumidified, brought and kept at a selected temperature. Air thus controlled is caused to flow through air distributor ducts such as vent duct, a defroster duct and a heated air duct and to blow out into the car through individual outlet assemblies. In these air distributor ducts, there are control vanes, shutters, doors or dampers controlled to open and close by manually operated dash controls or automatic control means so as to create various airflow modes, such as vent, bi-level, heat, defroster-and-heat (which is explained as def-and-heat for short in this specification), and defroster modes.

For selectively changing the air conditioning system to any desired airflow mode, as is disclosed in, for example, Japanese Utility Model Unexamined Publication No. 61-203,113 entitled "Display Panel of an Automobile Air Conditioning Control System", filed on Dec. 20, 1986, manually operated airflow mode selecting switch buttons are provided one individually to each airflow mode. These selecting switch buttons are selectively operated to establish a desired airflow mode. As the selecting switch buttons can be promptly operated in a driver's compartment of the car, any desired airflow mode is swiftly selected.

The bi-level and def-and-heat air flow modes are generally named as intermediate or dual airflow modes; two different airflow modes are simultaneously effective in each intermediate or dual airflow mode. In the bi-level airflow mode, while a control door in a defroster air duct is closed, control doors in vent and heat air ducts are opened to blow off air through vent air and heat air outlets, respectively. In the def-and-heat airflow mode, while the control door in the vent air duct is closed, the control doors in the defroster and heat air ducts are opened to blow off air through the defroster and heat air outlets, respectively. In such dual airflow modes, for example in the bi-level airflow mode, when air is blown off too much through the vent air outlet and directed to the upper halves of passengers in the car, the passengers feel chilly and, on the other hand, when air is blown off too much through the heat air outlet, the passengers feel too warm in their legs. However, the conventional automobile air conditioning systems, despite the fact that any desired airflow mode can be quickly created, are very difficult if not impossible to regulate in the dual airflow modes to control appropriately airflow conditions.

SUMMARY OF THE INVENTION

In view of the foregoing observations and description, it is an object of the present invention to provide an airflow mode control of an automatic automobile air conditioning system in which airflow is delicately regulated in dual airflow modes, in particular bi-level and defroster-and-heat airflow modes.

In accordance with the present invention, a control apparatus of an automobile air conditioning system has a plurality of airflow mode selecting switches, one individually to each different airflow mode, which cause a link mechanism to controllably open and close airflow control doors disposed in air ducts so as to create a selected airflow mode and regulating means associated with at least one intermediate or dual airflow mode in which two of the different airflow modes are made effective for regulating a quantitative ratio of dual outlet air.

In one preferred embodiment of the present invention, the regulating means taking the form of a three way switch connected in series to the airflow selecting switch for the dual airflow mode for causing the link mechanism to complementary and stepwise open and close the control doors associated with the dual airflow mode, thereby changing the quantitative ratio of dual outlet air stepwise.

In another preferred embodiment of the present invention, the regualting means takes the form of a variable resistor connected in series to the airflow mode selecting switch for the dual airflow mode for causing the link mechanism to complementarily linearly open and close the control doors associated with the dual airflow mode, thereby changing the quantitative ratio of dual outlet airflow linearly.

BRIEF DESCRIPTION OF THE DRAWINGS

The above and other objects and features of the present invention will become apparent from the following detailed description taken in conjunction with the preferred embodiments there of with reference to the accompanying drawings in which like parts or elements are designated by like numerals throughout the several views of th drawings and wherein.

DETAILED DESCRIPTION OF THE INVENTION

Because automobile air conditioning systems are well known, the present description will be directed in particular to elements forming part of, or cooperating directly with, apparatus in accordance with the present invention. It is to be understood that elements not specifically shown or described can take various forms well known to those skilled in the art.

Figure 1:
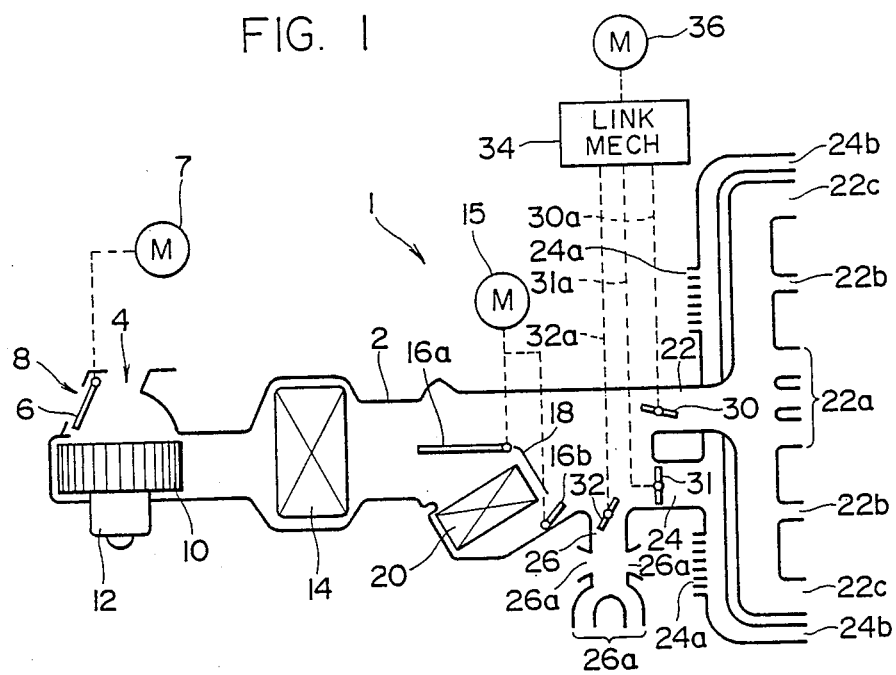
FIG. 1 is a schematic illustration of an automobile air conditioning system according to the present invention.

Referring now to the drawings, in particular to FIG. 1, shown therein is an automobile air conditioning system in which the present invention is embodied. As shown, the automobile air conditioning system 1 has a main air duct or distributor duct 2 provided with a recirculated air intake 4 and an ambient air intake 6 adjacent to each other. Between the air intakes 4 and 6, there is an air intake door 8 controlled by an electric reversible motor 7 which will be described in detail later to selectively open and close the air intakes 4 and 6. All incoming air, circulated or outside, is forced to flow into the air distributor duct 2 by means of a blower 10 driven by an electric motor 12. The air is passed first through an evaporator core 14 well known per se disposed downstream of the blower 10 in the distributor duct 2 so as to be cooled.

After the evaporator core 14, there are provided in the air distributor duct 2, air mixing or control doors 16a and 16b on both sides of a stationarily disposed buffer 18. Disposed adjacent to the buffer 18 is a heater core 20 well known per se into which an engine coolant water is conducted to heat air passed through the heater core 20. The air control doors 16a and 16b are controlled by an electric reverisble motor 15 to open or close so as to regulate the amount of air reaching the heater core 20. As is well known, by controlling the evaporator and heater cores 14 and 20, and the control doors 16a and 16 b, heated air is blended with unheated air to produce a required outlet air temperature.

At the downstream end of the air distributor duct 2, there are a vent air duct 22, a defroster air duct 24 and a heat air duct 26 all in communication with the air distributor duct 2. The vent air duct 22 has a center air outlet 22a, lower air outlets 22b, and side air outlets 22c opening inside the car. The defroster air duct 24 has main defroster air outlets 24a with louvers and side defroster air outlets 24b opening inside the car. The heat air duct 26 has a plurality of heat air outlets 26a opening inside the car. At conjunctions between the air distributor duct 2 and the respective air ducts 22, 24 and 26, there are disposed control dampers or doors 30, 31 and 32 automatically controlled to open and close.

These control doors 30, 31 and 32 are operatively connected to and controlled by a link mechanism 34 through connecting rods 30a, 31a and 32a, respectively. This link mechansim 34 is actuated by an electric reverisble motor 36 to open and close the control doors 30, 31 and 32 corelatively to one another so as to selectivley provide required airflow modes such as a vent airflow mode, a bi-level airflow mode, a heat airflow mode, a def-and-heat airflow mode and a defroster airflow mode. The link mechanism 34 may take various forms well known in the art. One such a link mechanism has been disclosed in, for example, U.S. Pat. No. 4,333,340 entitled "Electric Reversible Motor Control" issued to Hara et al. on June 15, 1982. The control doors 30-32 exemplified in FIG. 1 are shown in the positions to provide the bi-level airflow mode. In this airflow mode, the contro doors 30 and 32 for the vent and heat air ducts 22 and 26 are opened halfway while the control door 31 for the defroster air duct 24 is fully closed, so that air of a relatively low outlet air temperature is blown off into the car through the center and side air outlets 22a, 22b and 22c of the vent air duct 22 and, on the other hand, air of a relatively high outlet air temperature passed through the heater core 20 is blown off into the car through the air outlets 26a of the heat air duct 26.

Figure 2:
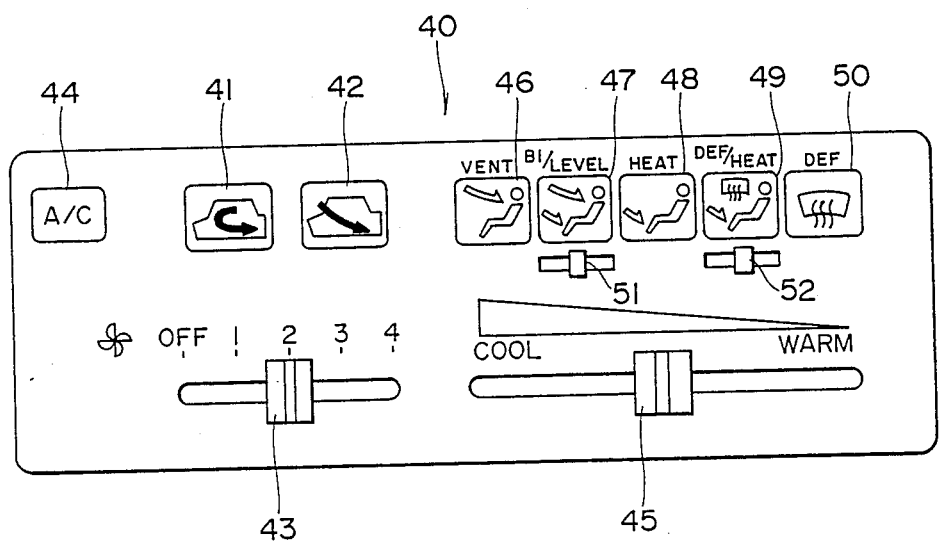
FIG. 2 is an illustration of a control panel for the automobile air conditioning system of FIG. 1.

Referring to FIG. 2, illustrated therein is an air conditioning system control means including various control switch buttons and knobs for selecting and controlling airflow mode, air amount, directions, blending, etc. The air conditioning system control switch buttons are, as is well known, installed in an instrument or a dash panel in a driver's compartment of the car. Switch buttons 41 and 42 are provided for causing an electric reversible motor 7 to turn the intake door 8 so as to selectively open and close the recirculated air intake 4 and the ambient air intake 6, thereby to take air, recirculated or outside, into the air distributor duct 2. Specifically, when the switch button 41 is pushed, the electric reversible motor 7 is rotated in one direction to turn the air intake door 8 to close the ambient air intake 6, so that the recirculated air intake 4 is opened to allow air inside the car to be taken into the air distributor duct 2. On the other hand, when the switch button 42 is pushed, the electric reversible motor 7 is rotated in the opposite direction to turn the air intake door 8 to close the recirculated air intake 4 and, therefore, the ambient air intake 6 is opened, allowing air outside the car to be taken into the air distributor duct 2. A slide switch knob 43 is provided to control the speed of the electric motor 12 of the blower 10 and has an off-position and first to fourth operating positions. When the slide switch button 43 is slid to the off position, the electric motor 12 coupled to the blower 10 stops its rotation, so that no air is taken in. At any operating position, the slide switch knob 43 causes the electric motor 12 to rotate, so as to rotate the blower 10 to take in air, recirculated or outside, and to force the air taken in toward the evaporator core 14. As the slide switch knob 43 is moved toward the fourth operating position, the electric motor 12 increases its speed of rotation so as to proportionally increase an amount of incoming air into the air distributor duct 2 per unit time. To activate the evaporator core 14, there is provided an air conditioning switch button (A/C button) 44 which is well known per se in the art. In order to regulate the outlet temperature of air distributed into various ducts, there is an outlet air temperature control slide knob 45 which controls openings of the control doors 16a and 16b correlatively so as to vary a quantitative ratio of heated air to cooled air either substantially linearly or stepwise. When the outlet air temperature control slide switch knob 45 is slid toward the indication "WARM", the doors 16a and 16b are positioned such that the amount of air passed through the heater core 20 is increased to provide a hot mixture of outlet air. Conversely, as the outlet air temperature control slide switch knob 45 is slid toward the indication "COOL", the amount of air passed through the theater core 20 is decreased, lowering the outlet air temperature of outlet air mixture.

There are five airflow mode selecting switch buttons 46 to 50 arranged side by side in a line which are selectively operated to provide desired airflow modes, and two regulating switch knobs 51 and 52 which allow delicate variations of outlet air in dual airflow modes to be made. The airflow mode selecting switch buttons 46 to 50 select the vent, bi-level, heat, def-and-heat, and defroster airflow modes, respectively, and the regulating switch knobs 51 and 52 create a vent air dominant or a heat air dominant bi-level airflow in the bi-level airflow mode, and a heat air dominant or a defroster air dominant airflow flow in the def-and-heat airflow mode. These airflow mode selecting and regulating switch buttons and knobs 46 through 52 cooperate with the electric reversible motor 36 through an electric controller 60 shown in FIG. 3 so as to operate the link mechanism 34 in order to provide any desired mode of outlet airflow.

Figure 3:
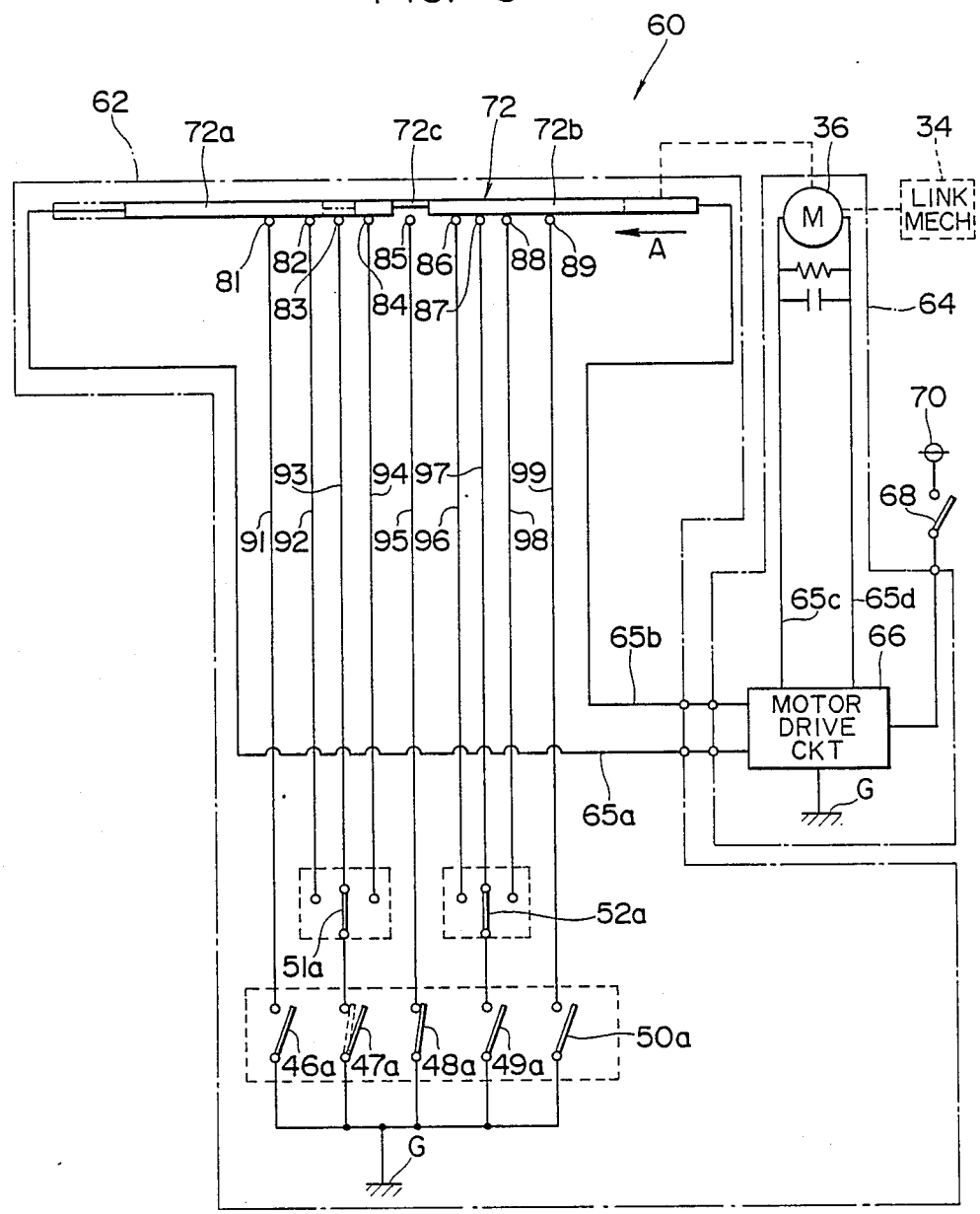
FIG. 3 is a control circuitry for controlling the automobile air conditioning system in accordance with a preferred embodiment of the present invention.

Referring to FIG. 3 showing the electric controller 60, the electrical controller 60 basically comprises two circuitry units, namely a control unit 62 and a drive unti 64. The drive unit 64 includes a motor drive circuit 66 connected to a source of power such as a battery 70 through an ignition switch 68, ground G, and the electric reversible motor 36 controlled by the motor drive circuit 66.

The control unit 62 includes therein airflow mode selecting switches 46a to 50a which are associated with the airflow mode selecting switch buttons 46 to 50, respectively and connected to ground G at one side in parallel with one another; an airflow mode detector 72 in the form of a position sensor which is mounted to slidably move back and forth, namely, to right and left viewed in FIG. 3, and is mechanically connected with the electric reversible motor 36 which serves to move or drive the detector 72 back and forth. Regulating switches 51a and 52a are associated with and controlled by the regulating slide knobs 51 and 52, respectively. The airflow mode detector or position sensor 72 is made of an electrically conductive member and has an electrically non-conductive samll section 72c at the midway thereof by which it is divided into two electrically conductive divisions 72a and 72b which are electrically isolated form each other. The airflow mode selecting and regulating switches 46a to 52a are electrically connected to the airflow mode detector 72 be means of electric contacts 81 to 89 which are arranged in this numerical order and associated with the mode selecting and regulating switches 46a to 52a, respectively and selectively disconnectable therefrom. Between the airflow mode detector 72 and the dual airflow mode selecting switches, namely the bi-level and def-and-heat airflow mode selecting switches 47a and 49a, there are interconnected the regulating switches 51a and 52a each being of a type of a three way switch, Owing to the provision of those airflow mode selecting and regulating switches 46a to 52a, nine possible power supply circuits or conductors 91 to 99 are configured t supply an appropriate electric current to the motor drive circuit 66 from the free ends of the sections or divisions 72a and 72b via conductors 65a and 65b.

In operation of the air conditioning system control shown in FIGS. 1 to 3, when, for example, the automobile air conditioning system 1 is changed from the heat airflow mode to the bi-level airflow mode by pushing the airflow mode selecting switch button 47 to close the bi-level airflow mode selecting switch 47a as is shown by a double dotted line in FIG. 3, a power supply circuit for the reversible electric motor 36 is closed through the motor drive circuit 66, the electrically conductive division 72a of the airflow mode detector 72, the closed bi-level airflow mode selecting switch 47a and the regulating switch 51a in its normal position, allowing an appropriate electric current to be applied from the battery 70 through power supply lines 65c and 65d, the electric reversible motor 36 and the power supply line 64d, so that the electric reversible motor 36 is caused to rotate in the clockwise direction. As a result of the clockwise rotation of the electric reversible motor 36, the link mechanism 34 is caused to open the control doors 30 and 32 to their approximately middle position so as to allow heat air and vent air to pass therethrough in the approximate proportion 1:1, and thereby to blow off through the outlets 22a, 22b and 22c of the vent air duct 22 and the outlet 26a of the heat air duct 26. At the same time, the airflow mode detector 72 is moved in a direction shown by arrow A in FIG. 3 to a position shown by a dash-dot line in FIG. 3, positioning the electrically non-conductive section 72c thereof at a position where the electric contact 83 in connection with the bi-level airflow mode select switch 47a through the regulating switch 51a is located to open the power supply circuit. Consequently, the electric reversible motor 36 stops to set the air conditioning system 1 in the bi-level airflow mode.

While the air conditioning system 1 is in the bi-level airflow mode, when the regulating switch knob 51 is operated and slidably moved toward the heat airflow mode selecting switch button 48, a power supply circuit is configured by the electric contact 84, the electrically conductive division 72a of the airflow mode detector 72, the motor drive circuit 66 and the closed bi-level airflow mode selecting switch 47a; the electric reversible motor 36 is caused to rotate in the counterclockwise direction, moving the airflow mode detector 72 opposite to the direction shown by the arrow A. As a result of this counterclockwise rotation of the electric reversible motor 36, the link mechanism 34 is caused to open further the control door 32 in the heat air duct 26 through a slight angle and complementarily to close the control door 30 in the vent air duct 22 through a slight angle, so as to allow heat air and vent air to pass therethrough in an imbalanced prroportion and blow off through their respective air outlets 22a, 22b, 22c and 26a. At the same time, the airflow mode detector 72 brings the non-conductive section 72c thereof to a position where the electric contact 84 in connection with the regulating switch 51a is located beneath section 72c so as to open the power supply circuit, stopping the electric reversible motor 36 to create a heat air dominant airflow in the bi-level airflow mode.

On the other hand, when the regulating switch knob 51 is operated and slidably moved toward the vent airflow mode selecting switch button 46 to close the regulating switch 51a so as to thereby form a power supply circuit through the electric contact 82, the electrically conductive section 72a of the airflow mode detector 72, the motor drive circuit 66 and the bi-level airflow mode selecting swithch 47a, electric current is applied through the power supply lines 65c and 65d so as to cause the electric reversible motor 36 to rotate in the clockwise direction, moving the airflow mode detector 72 in the direction of arrow A. As a result of this counterclockwise rotation of the electric reversible motor 36, the link mechanism 34 is caused to open the control door 30 in the vent air duct 22 to more than half and complementarily to close the control door 32 in the heat air duct 26 so as to allow heated air and vent air to pass therethrough in an imbalanced proportion and blow off through their respective air outlets 22a, 22b, 22c and 26a. At the same time, the airflow mode detector 72 brings the electrically non-conductive section 72c thereof in a position where the electrical contact 82 actively connected to the regulating switch 51 is located so as to open the power supply circuit, stopping the electric reversible motor 36 to create a vent air dominant airflow in the bi-level airflow mode.

In a same way as described above, the airflow selecting switch buttons 46, 48, 49 and 50 set the air conditioning system 1 to the vent airflow mode, heat airflow mode, def-and-heat airflow mode and defroster airflow mode, respectively. In the def-and-heat airflow mode, the air conditioning system 1 can be set to create the heat air dominant airflow in the def-and-heat airflow mode or a defroster air dominant airflow in the def-and-heat airflow mode by operating the regulating switch knob 52 toward the heat airflow selecting switch button 48 or the defroster airflow mode selecting switch button 50, respectively.

Figure 4:
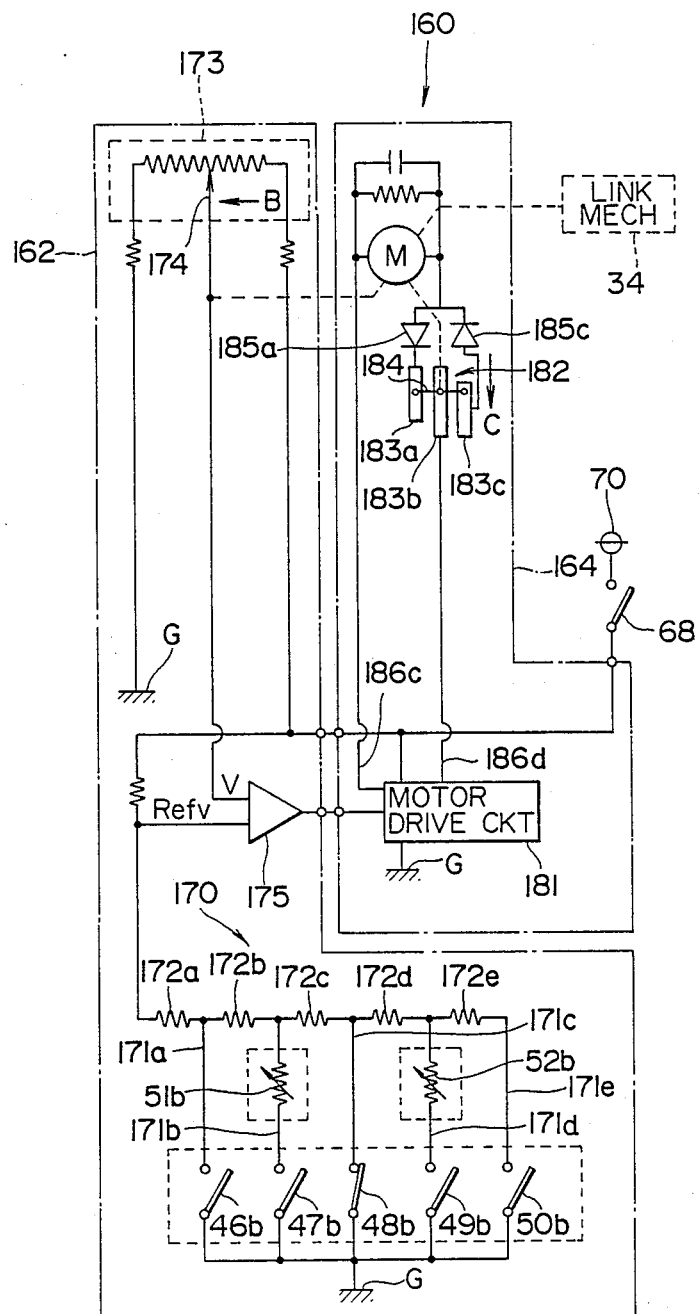
FIG. 4 is a control circuitry for controlling the automobile air conditioning system in accordance with another preferred embodiment of the present invention.

Referring to FIG. 4 showing another preferred embodiment of the electric controller of the airflow mode control for the automobile air conditioning system 1, the electric control circuitry 160 basically comprises two circuit units, namely a control unit 162 and a motor drive unit 164. The control unit 162 includes therein a potential divider 170 with fixed taps 171a to 171e between fixed resistors 172a to 172e; a potentiometer 173 is associated with a sliding brush or tap 174 which is moved back and forth. One movement direction is shown by arrow B in FIG. 4. Airflow mode selecting switches 46b to 50b are connected between ground G and the potential divider 170 in parallel with one another and are operatively associated with the airflow mode selecting switch buttons 46 to 50 in the driver's compartment shown in FIG. 2, respectively. A comparator 175 is also provided. The fixed taps 171a to 171e are connected to the airflow mode selecting switches 46b to 50b. Between the fixed taps 171b and 171d and airflow mode selecting switches 47b and 49b, there are variable resistors 51b and 52b associated with and operated by the regulating switch knobs 51 and 52, respectively.

The motor drive unit 164 includes a motor drive circuit 181 connected to the battery 70 through the ignition switch 68 and connected to ground G. A limit switch assembly 182 is connected to circuit 181. The limit switch assembly 182 comprises three fixed contact segments 183a, 183b and 183c different in length; diodes 185a and 185c connected on one side to the fixed contact segments 183a and 183c reversed in polarity, and on the other side to the electric reversible motor 36. A slidable brush or tap 184 is mechanically coupled to the electric reversible motor 36 to slidably move up and down over the fixed contact segments 183a to 183c. One direction of movement is shown by an arrow C in FIG. 4. The slidable brush 184 is always maintained in contact with the center fixed contact segment 183b connected to power supply lines 168d but is brought out of contact with the fixed contact segment 183a at its lower position of movement or with the fixed contact segment 183c at its upper position of movement.

When any one of the switches 46b to 50b is closed, a power supply circuit is formed by one or more of the resistors 172a to 172e of the potential divider 172, the potentiometer 173, and the comparator 175. As a result, a reference potential Ref$_V$ for the comparator 173 is fixedly set according to the total resistance of the one or more of the resistors 172a to 172e.

The control unit 162 thus formed causes the motor drive circuit 181 to allow the electric motor 36 to rotate in one direction, so as to shift the sliding brush 174. When the potential V provided by the potentiometer 173 becomes equal to the reference potential Ref$_V$, the comparator 175 stops the electric reversible motor 36 through the motor drive circuit 181. During the movement of the sliding brush 174, the electric reversible motor 36 causes the link mechanism 34 to open and close the control doors 30 to 32 so as to create a required airflow mode in the same way as in the previous embodiment.

The potentiometer 173 and the link mechanism 34 are mechanically connected to and operated by the electric reversible motor 36. The slidable brush 184 is moved up or down by the electric reversible motor 36. Specifically, when the electric reversible motor 36 causes the link mechanism 34 to open and close the control doors 30 to 32 so as to create the vent airflow mode, the slidable brush 184 is moved down to bring the center fixed contact segment 183b in electric disconnection from the fixed contace segment 183a so as to cut off electric power supplied to the electric reversible motor 36. On the other hand, when the electric reversible motor 36 rotates in the reversed direction and causes the link mechanism 34 to open and close the control doors 30 to 32 so as to create the defroster airflow mode, the slidable brush 184 is moved up to bring the center fixed contact segment 183b in electric disconnection from the fixed contact segment 183c so as to cut off electric power supplied to the electric reversible motor 36. Owing to the provision of the limit switch assembly 182, the electric reversible motor 36 is prevented from making an excessive rotation which occurs due to errors between the reference potential Ref$_V$ and the potential V provided by the potentiometer 173.

While the automobile air conditioning system 1 is in either the bi-level or the def-and-heat airflow mode, airflow is precisely regulated by operating the regulating knob 51 or 52. Specifically, when each of the regulating switch knobs 51 and 52 is operated, the corresponding variable resistor 51b, 52b changes linearly so as to vary the reference potential Ref$_V$. Consequently, the electric reversible motor 36 is controlled to turn according to changes of the reference potential caused by the variable resistor Therefore, the control doors 30, 31 and 32 are opened and closed with a linear control through the link mechanism 34.

Since certain changes and modifications may be made in the described air conditioning system and control apparatus without departing from the scope of the invention herein involved, it is intended that all matter contained in the description thereof and as shown in the accompanying drawings shall be interpreted as illustrative and not limiting sense.

What is claimed is:

1. An air conditioning control apparatus of an automobile air conditioning system in which different airflow modes including at least one dual airflow mode in which two of said different airflow modes are simultaneously made effective are selectively created by opening and closing airflow control doors disposed in air ducts and operatively coupled to a power driven mechanism, said air conditioning control apparatus comprising:

airflow mode selecting switches provided one individually to each of said different airflow modes and arranged in a line on a dash panel in a driver's compartment of a car for selectively creating a desired airflow mode, a dual airflow mode selecting switch for said dual airflow mode being disposed between said airflow mode selecting switches for said two different airflow modes made simultaneously effective by said dual airflow mode selecting switch;

a controller actuated by any one of said airflow selecting switches for controlling said power driven mechanism to selectively open and close said control doors according to said desired airflow mode; and regulating means for causing said controller to regulate openings of said airflow control doors so as to thereby regulate a quantity of outlet air in at least one of said different airflow modes; said regulating means including a manually operative member disposed near said airflow mode selecting switch associated with said dual airflow mode and slidably moved back and forth in the direction in which said airflow mode selecting switches are arranged for causing an increase in the quantity of outlet air in the one of said two different airflow modes effective in said dual airflow mode associated with the one of said airflow selecting switches toward which said manually operative member of said regulating means is slidably moved.

2. An air conditioning control apparatus as defined in claim 1, wherein said different airflow modes include a bi-level airflow mode as said dual airflow mode in which a vent and a heat airflow mode are simultaneously effective.

3. An air conditioning control apparatus as defined in claim 1, wherein said different airflow modes include a defroster-and-heat airflow mode as said dual airflow mode in which a defroster and a heat airflow mode are simultaneously effective.

4. An air conditioning control apparatus a defined in claim 1, wherein said different airflow modes include a bi-level and a defroster-and-heat airflow mode as said dual airflow mode in which a vent and a heat airflow mode, and a defroster and said heat airflow mode are simultaneously effective, respectively.

5. An air conditioning control apparatus of an automobile air conditioning system in which different airflow modes including at least one dual airflow mode in which two of said different airflow modes are simultaneously made effective are selectively created by opening and closing airflow control doors disposed in air ducts, said air conditioning control apparatus comprising:
a power driven mechanism comprising a link mechanism operatively coupled to said control doors and an electric reversible motor operatively coupled to said link mechanism;
airflow mode selecting switches provided one individually to each of said different airflow modes and arranged in a line on a dash panel in a driver's compartment of a car for selectively creating a desired airflow mode;
a controller actuated by any one of said airflow mode selecting switches and sensing predetermined angular positions of said electric reversible motor to stop said electric reversible motor so as to selectively open and close said control doors to create any one of said different airflow modes; and
regulating means for causing said controller to regulate openings of said airflow control doors to thereby regulate a quantity of outlet air in at least one of said different airflow modes.

6. An air conditioning control apparatus as defined in claim 5, wherein said controller includes a position sensor which comprises an electrically conductive member which is operatively coupled to said electric reversible motor for sliding movement in opposite directions and divided into two divisions electrically isolated from each other with an electrically non-conductive section disposed therebetween; and electric contacts which are connected at their one ends to said airflow mode selecting switches, respectively, and in contact with said electrically conductive member for forming a power supply circuit for applying electric power so said electric reversible motor when any one said airflow mode selecting switch is closed, one of said electric contacts being brought into an alignment with said non-conductive section of said electrically conductive member when said electric reversible motor turns enough to create an airflow mode associated with the closed airflow mode selecting switch to thereby open said power supply circuit so as to stop said electric reversible motor.

7. An air conditioning system control apparatus as defined in claim 6, wherein said regulating means is at least one three way switch operated by a manually operative member which is connected at a common end to an airflow mode selecting switch associated with said at least one dual airflow mode and connectable at its opposite end to three electric contacts arranged between said electric contacts connected to an airflow mode selecting switch associated with said at least one dual airflow mode and in contact with said electrically conductive member.

8. An air conditioning system control apparatus as defined in claim 5, wherein said controller includes a position sensor which comprises a motor drive circuit, a potentiometer operatively coupled to said electric reversible motor to provide a potential according to said predetermined angular positions of said electric reversible motor, potential generating means for generating a reference potential according to said airflow mode selecting switches, a comparator for comparing said reference potential generated when any one of said airflow mode selecting switches is closed with said potential provided by said potentiometer, said electric reversible motor turning enough to create an airflow mode corresponding to the closed airflow mode selecting switch and to cause said potential from said potentiometer to equal said reference potential thereby inactivating said motor.

9. An air conditioning system control apparatus as defined in claim 8, wherein said potential generating means comprises a potential divider composed of a series of resistors, said airflow mode selecting switches being connected at the junctures of said series of resistors in parallel with one another.

10. An air conditioning system control apparatus as defined in claim 9, wherein said regulating means includes a variable resistor connected to an airflow mode selecting switch for said at least one dual airflow mode.

11. An air conditioning cotnrol apparatus of an automobile air conditioning system in which different airflow modes are selectively created by opening and closing airflow control doors disposed in ari ducts and operatively coupled to a power driven mechanism, said air conditioning control apparatus comprising:
airflow mode selecting switches provided one individually to each of said different airflow modes and arranged in a line on a dash panel in a driver's compartment of a car for selectively creating a desired airflow mode;
a controller actuated by any one of said airflow mode selecting switches for controlling said power driven mechanism to open and close said control doors according to said desired airflow mode; and
regulating means including a manually operative member disposed adjacent to linear arrangement of said airflow mode selecting switches in said dash panel for causing said controller to regulate openings of said airflow control doors so as to cause an increase in the quantity of outlet air in one of said different airflow modes associated with the one of said airflow mode selecting switches toward which said regulating means is directionally moved.

12. An air conditioning control apparatus as defined in claim 11, wherein said regulating means is a manually operative member slidable in a direction of said linear arrangement of said airflow mode selecting switches.

13. An air conditioning control apparatus as defined in claim 11, wherein said power driven mechanism comprises a link mechanism operatively coupled to said control doors and an electric reversible motor operatively coupled to said link mechanism, and said controller includes a position sensor for sensing predetermined angular positions of said electric reversible motor to stop said electric reversible motor so as to selectively open and close said control doors and create any one of said different airflow mode.

14. An air conditioning control apparatus of an automobile air conditioning system in which different airflow modes including at least one dual airflow mode in which two of said different airflow modes are simultaneously made effective are selectively created by opening and closing airflow control doors disposed in air ducts and operatively coupled to a power driven mechanism, said air conditioning control apparatus comprising:
   a power mechanism comprising a link mechanism operatively coupled to said control doors and an electric reversible motor operatively coupled to said link mechanism;
   airflow mode selecting switches provided one individually to each of said different airflow modes and arranged in a line on a dash panel in a driver's compartment of a car for selectively creating a desired airflow mode;
   a controller including a position sensor actuated by any one of said airflow mode selecting switches and sensing predetermined angular positions of said electric reversible motor to stop said electric reversible motor so as to selectively open and close said control doors and create any one of said different airflow modes; and
   regulating means for causing said controller to slightly regulate openings of said airflow control doors, so as to vary slightly regulate the quantitive ratio of outlet air in at least one of said different airflow modes.

15. An air conditioning control apparatus as defined in claim 14, wherein said position sensor comprises an electrically conductive member which is operatively coupled to said electric reversible motor for sliding movement in opposite directions and divided into two divisions electrically isolated from each other with an electrically non-conductive section disposed therebetween; and electric contacts which are each connected at one end to said airflow mode selecting switches and are in contact with said electrically conductive member for forming a power supply circuit for applying electric power to said electric reversible motor when any one of said airflow mode selecting switches is closed, one of said electric contacts being brought into alignment with said non-conductive section of said electrically conductive member when said electric reversible motor turns enough to create an airflow mode associated with the closed airflow mode selecting switch to thereby open said power supply circuit to stop said electric reversible motor.

16. An air conditioning system control apparatus as defined in claim 15, wherein said regulating means is at least one three way switch operated by a manually operative member connected at a common end to an airflow mode selecting switch associated with said at least one dual airflow mode and connectable at its opposite end to three electric contacts arranged between said electric contacts connected to an airflow mode selecting switch associated with said at least one dual airflow mode and in contact with said electrically conductive member.

17. An air conditioning system control apparatus as defined in claim 14, wherein said position sensor comprises a motor drive circuit, a potentiometer operatively coupled to said electric reversible motor to provide a potential according to said predetermined angular positions of said electric reversible motor, potential generating means for generating a reference potential according to said airflow mode selecting switches, a comparator for comparing said reference potential generated when any one said airflow mode selecting switch is closed with said potential provided by said potentiometer, said electric reversible motor turning enough to create an airflow mode corresponding to the closed airflow mode selecting switch and to cause said potential from said potentiometer to equal said reference potential and inactivate said electric reversible motor.

18. An air conditioning system control apparatus as defined in claim 17, wherein said potential generating means comprises a potential divider composed of a series of resistors, said airflow mode selecting switches being connected at the junctures of said series of resistors in parallel with one another.

19. An air conditioning system control apparatus as defined in claim 18, wherein said regulating means includes a variable resistor connected to an airflow mode selecting switch for said at least one dual airflow mode.

* * * * *